April 5, 1949.   J. GREBMEIER   2,466,098
VALVE
Filed April 4, 1944
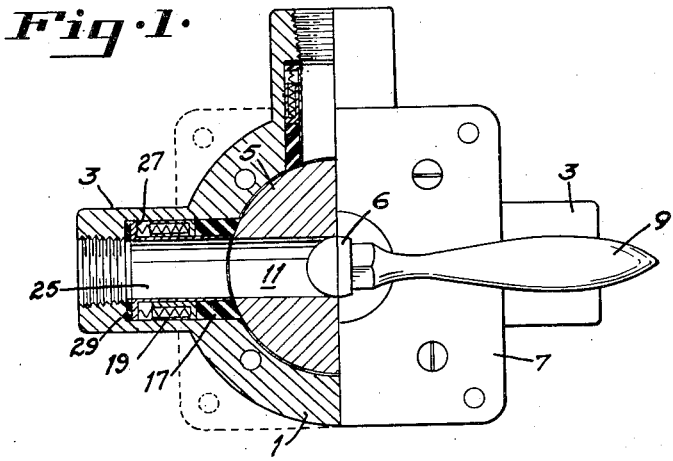
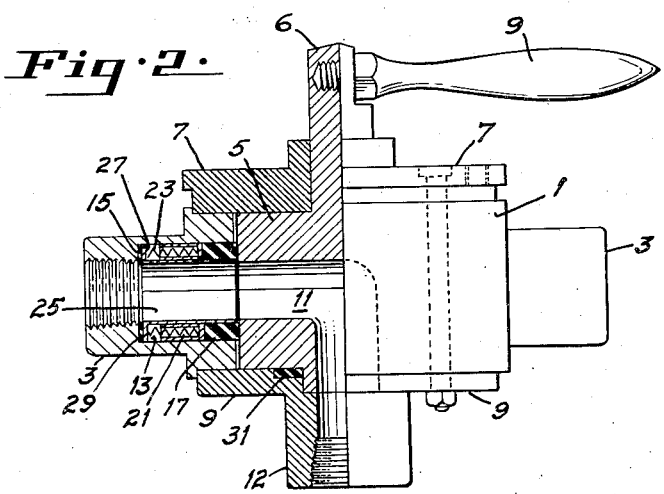
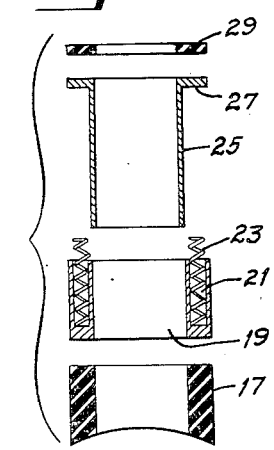
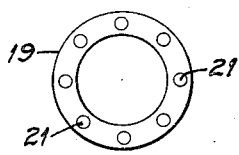
INVENTOR.
JOSEPH GREBMEIER
BY Charles O Bruce
ATTORNEY Patented Apr. 5, 1949

2,466,098

UNITED STATES PATENT OFFICE 2,466,098

VALVE

Joseph Grebmeier, Menlo Park, Calif.

Application April 4, 1944, Serial No. 529,499

3 Claims. (Cl. 251—113)

My invention relates to valves, and more particularly to valves for the handling of low viscosity liquids such as gasoline, butane, kerosene and the like.

Among the objects of my invention are:

1. To provide a novel and improved valve which is easily operable and has tight sealing characteristics.

2. To provide a novel and improved selector or multi-channel valve for low viscosity liquids, having tight sealing characteristics sufficient to isolate all channels except the particular one in use.

3. To provide a novel and improved valve for gasoline or the like, sealed against undesired by-passing of liquid at points in the valve which might normally provide leakage paths.

4. To provide a novel and improved selector valve of simple and rugged construction.

Additional objects of my invention will be brought out in the following description of a preferred embodiment of the same, taken in conjunction with the accompanying drawings wherein—

Figure 1 is a top plan view, partly in section, of a preferred embodiment of my invention in the form of a selector valve.

Figure 2 is an elevational view of the valve of Figure 1, partly in section.

Figure 3 is an exploded sectional view of the sealing assembly of my novel and improved valve structure.

Figure 4 is a plan view of the pressure ring element of Figure 3.

The preferred embodiment of my invention, as disclosed in the drawings, includes a cylindrical hollow body 1 having a plurality of radial ports 3 adapted for connection to supply or feed lines. In this hollow cylindrical body there is loosely fitted, a rotatable valve cylinder 5 having an axially extending stem 6 which is preferably tapped for the reception of a valve control handle 9. The cylinder has a right angle bore or passage 11 therethrough, one end of which is adapted to line up with each of the radial ports in succession as the cylinder is rotated. The other end of the bore terminates axially at that end of the cylinder opposite the stem end.

The valve cylinder 5 is held in position by end caps or covers 7 and 9 respectively, suitably bolted against the ends of the valve body. One of these end caps 7 is provided with an axial opening 11 therethrough to comfortably receive the valve stem. The other end cap 9 is formed with a central threaded port 12 in alignment with the axial portion of the cylinder passage 11.

Each of the aforementioned radial ports is undercut from its interior end to provide a cylindrical recess 13 in the wall thereof and terminating in a shoulder 15, such recess providing a cylindrical space for the reception of a sealing assembly. Such sealing assembly includes a sealing element 17 in the form of a cylinder of resilient material such as rubber or preferably neoprene when employed in a gasoline system. The sealing element is fitted into the cylindrical recess 13 with one end in contact with the valve cylinder 5. This contacting end of the sealing element is recessed on a radius corresponding to that of the valve cylinder to provide a snug complementary fit against such cylinder.

Pressure means are provided in the assembly for maintaining this sealing cylinder 17 in sealing pressure engagement against the valve cylinder 5. Such pressure means includes a pressure ring 19 having a plurality of spaced longitudinal holes 21 therein to receive pressure exerting springs 23 of the coil type. This pressure ring, like the sealing element, fits within the cylindrical space 13 provided in each radial port, and both the ring and the sealing element are maintained in proper operating position by a cylindrical sleeve 25 fitting within the pressure ring and sealing element and having a flange 27 extending laterally into the cylindrical space to provide a stop for the pressure exerting springs 23. The springs, accordingly, will exert pressure against the sleeve 25 in a direction opposite to that exerted against the sealing element 17 and, accordingly, such springs will act to hold the sleeve out of contact with the valve cylinder while at the same time continually exerting pressure against the sealing element in the direction of such valve cylinder.

The sleeve, at the same time, has the additional and important function of providing a seamless passage for the liquid throughout the greater extent of its associated radial port and precludes possible leakage of liquid between the engaging surfaces of the sealing element and the pressure ring.

Between the flange 27 and the shoulder 15, I prefer to insert a gasket 29 preferably of a material similar to that of the sealing element 17. Such gasket being under the compression effect of the compression springs, will serve to preclude any of the liquid from by-passing the sealing assembly.

As a precaution against leakage due to back pressure, I prefer to apply a gasket 31 between the valve cylinder 5 and the cap 9 surrounding the axial port 12.

The particular embodiment of my invention described is adapted for use as a selector valve in a gasoline fuel supply system where reliance is had upon a plurality of fuel tanks as a source of fuel, such tanks to be emptied successively by switching from one to the other as they become empty. It is quite essential in such a system that no inter-connection of fuel tanks be permitted through the valve. The supply lines must be thoroughly isolated from each other at all times. At the same time it is desirable that the valve be operable with ease.

In my improved valve, the only effective resistance offered to the rotation of the valve cylinder is that attributable to the sealing elements in pressure engagement with such cylinder, but inasmuch as the contact area of these sealing elements with the valve cylinder is relatively small, and the sealing elements themselves are of a resilient material, the resistance offered is, therefore, relatively slight, without detrimentally affecting the sealing ability of the sealing elements.

While I have provided effective sealing between the radial ports and the valve cylinder, I have at the same time blocked all possibility of liquid leaking around or by-passing any of the sealing assemblies. Thus, the liquid will be constrained to follow the desired passages through the valve, which are intended for the flow of such liquid.

While the valve has been described as having been designed particularly for use in a fuel supply system, wherein a fuel tank is connected to each of the radial ports, the valve may, of course, be employed in a reverse sense, as by connecting a source of liquid to the axial port and selectively supplying such fuel to any one of a plurality of destinations in succession as desired.

While I have described a preferred embodiment of my invention in considerable detail, the underlying principles thereof are applicable to valves of differing structures and I, accordingly, do not desire to be limited in my protection to the specific embodiment disclosed, except as may be necessitated by the appended claims.

I claim:

1. A valve comprising a hollow cylindrical body having a radial port therein and formed with a cylindrical recess at the interior end thereof; a valve cylinder loosely fitted within said hollow cylindrical body and having a passage therethrough, one end of which is adapted to align with said radial port during rotation of said valve cylinder; a hollow cylindrical sealing element disposed in said cylindrical recess with one end facing said valve cylinder and recessed on a radius corresponding to the radius thereof; a pressure ring disposed behind said sealing element and in alignment therewith; a sleeve extending through said aligned sealing element and pressure ring and having a lateral flange extending behind said pressure ring, means under compression between said pressure ring and said flange tending to separate the same, and sealing means between said flange and the end of said cylindrical recess to preclude by-passing of liquid around said cylindrical sealing element.

2. A valve comprising a hollow cylindrical body having a radial port therein formed with a cylindrical recess at the interior end thereof; a valve cylinder loosely fitted within said hollow cylindrical body and having a passage therethrough, one end of which is adapted to align with said radial port during rotation of said valve cylinder; a hollow cylindrical sealing element disposed in said cylindrical recess with one end facing said valve cylinder and recessed on a radius corresponding to the radius thereof; a pressure ring having a plurality of spaced holes in one end thereof and including a pressure spring in each of said holes, said ring being disposed behind said sealing element and in alignment therewith; a sleeve extending through said aligned sealing element and pressure ring and having a lateral flange extending behind said springs and providing a stop therefor, and sealing means between said flange and the end of said cylindrical recess to preclude by-passing of liquid around said cylindrical sealing element.

3. A valve comprising a hollow cylindrical body having a radial port for a pipe connection or the like and formed with a cylindrical recess at the interior end thereof; a valve cylinder loosely fitted within said hollow cylindrical body and having a passage therethrough, one end of which is adapted to align with said radial port during rotation of said valve cylinder; a hollow cylindrical sealing element disposed in said cylindrical recess with one end facing said valve cylinder and recessed on a radius corresponding to the radius thereof; a pressure ring having a plurality of spaced holes in one end thereof and including a pressure spring in each of said holes, said ring being disposed behind said sealing element and in alignment therewith; a sleeve extending through said aligned sealing element and pressure ring and having a lateral flange extending behind said springs and providing a stop therefor; and sealing means between said flange and the end of said cylindrical recess to preclude by-passing of liquid around said cylindrical sealing element.

JOSEPH GREBMEIER.

REFERENCES CITED

The following references are of record in the file of this patent:

UNITED STATES PATENTS

| Number | Name | Date |
|---|---|---|
| 743,511 | Huxley | Nov. 10, 1903 |
| 1,062,064 | Ward | May 20, 1913 |
| 1,607,827 | Herrmann | Nov. 23, 1926 |

FOREIGN PATENTS

| Number | Country | Date |
|---|---|---|
| 174,749 | Switzerland | Apr. 16, 1935 |
| 349,531 | Italy | June 16, 1937 |